Sept. 28, 1965  W. GROLMANN ETAL  3,208,806
ANTI-FRICTION BEARING

Filed July 24, 1962  3 Sheets-Sheet 1

INVENTORS
Wilhelm Grolmann
Engelbert Koss
Wilhelm Schlueter by: Michael S. Striker Sept. 28, 1965   W. GROLMANN ETAL   3,208,806
ANTI-FRICTION BEARING
Filed July 24, 1962   3 Sheets-Sheet 3

INVENTORS
Wilhelm Grolmann
Engelbert Koss
Wilhelm Schlueter
BY
Michael S. Striker

United States Patent Office 3,208,806
Patented Sept. 28, 1965

3,208,806
ANTI-FRICTION BEARING
Wilhelm Grolmann, Dortmund-Kirchhoerde, Engelbert Koss, Lippstadt, and Wilhelm Schlueter, Dortmund, Germany, assignors to Firma Eisenwerk Rothe Erde G.m.b.H., Dortmund, Germany
Filed July 24, 1962, Ser. No. 212,000
Claims priority, application Germany, July 28, 1961, E 21,460
11 Claims. (Cl. 308—199)

The present invention relates to anti-friction bearings and especially to anti-friction bearings of large diameters and/or multi-row anti-friction bearings. The rolling elements of anti-friction bearings are usually held spaced from each other by spacer means located between adjacent rolling elements. Such spacer means are preferably constructed to engage a substantial surface portion of adjacent rolling elements so that the specific surface pressure between rolling elements and spacer means can be held to a minimum, reducing thereby wear, and the spacer means are also preferably constructed to make the center distance of adjacent rolling elements as small as possible so that a maximum number of rolling elements may be provided in a bearing of a given diameter.

Such spacer means provide for a more or less rigid guide of the rolling elements, which rigidity will not necessarily be detrimental to the proper function of the bearing since, provided the inner race surfaces between which the rolling elements are located extend in substantially parallel planes, such a more or less rigid guide will only improve the quality of the bearing. However, if the bearing is not supported on a perfectly plane face, or if the bearing support is not sufficiently rigid, the bearing races may become slightly warped, especially when the same are subjected to off center unequal forces. In such a case the rigidity of the guide constituted by the spacer means will have a detrimental effect, since the rolling elements thus guided cannot properly adapt themselves to the distorted bearing races and this will result in a reduction of the free rolling ability of the rolling elements, causing in turn excessive or one sided wear on the race surfaces engaged by the rolling elements. In extreme cases, especially in large diameter bearings which are subjected to great eccentric forces, this may lead to a complete blocking of the bearing.

One object of the present invention is to overcome this disadvantage of anti-friction bearings of the type mentioned.

A further object of the present invention is to provide spacer means which permit adaption of the chain of rolling element to slightly warped bearing races.

It is an additional object of the present invention to provide spacer means which will considerably reduce the wear of the various elements of the anti-friction bearing.

It is yet a further object of the present invention to provide, especially for bearings which are used to support elements carrying out quickly alternating turning movements in opposite directions, spacer means which will produce a damping of the turning movement.

With these objects in view, the anti-friction bearing of applicants' invention includes elastic spacer means located at least between some of the rolling elements of the anti-friction bearing and each of the elastic spacer means having in a plane normal to a plane of symmetry between the respective adjacent rolling elements a substantially rectangular cross section having a diagonal greater than the maximum distance between the inner race surfaces, so that said spacer means, in compressed as well as in uncompressed condition, are prevented from tilting.

Such elastic spacer means may be located after each third or each fourth of successive rolling elements, whereas the other rolling elements may be held spaced from each other by conventional rigid spacer means, or elastic spacer means may also be located between each pair of adjacent rolling elements.

The longitudinal dimension and the elasticity of the elastic spacer means according to applicants' invention are preferably such that the elastic spacer means will not impart a pretension to the bearing or the chain of rolling elements under normal operating condition of the bearing.

Preferably, the end faces of the elastic spacer means which are in contact with the rolling elements adjacent thereto are concavely curved so as to engage the adjacent rolling elements along surface portions constituting a substantial portion, for instance 40% of the rolling surface of the rolling elements, so as to reduce the specific surface pressure between rolling elements and elastic spacer means and thereby reduce the wear thereof.

In a preferred form each elastic spacer means is made integrally in one piece from elastic material. This preferred form is especially used in an anti-friction bearing supporting a member which carries out quickly alternating turning movements in opposite directions relative to another member for damping such turning movement. During such turning movement the rolling elements are subjected to a crowding action so that the elastic spacer means are compressed in axial direction and simultaneously expanded in radial direction into contact with the inner surface of the bearing races so that the turning movement is braked or damped.

A similar effect may also be obtained by elastic spacer means having at least one rigid portion and at least one elastic portion preferably fixed to the rigid portion by means of a dovetail connection.

The elastic spacer means may also be formed by a pair of rigid members and an elastic member sandwiched therebetween, which may be formed by a compression spring, or the elastic spacer means may include a rigid annular member and a solid core of elastic material extending fixed to the annular member transversely through the interior thereof and having a pair of opposite end faces respectively in contact with adjacent rolling elements, and holding under normal condition the rolling elements out of contact with the rigid annular member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 10:
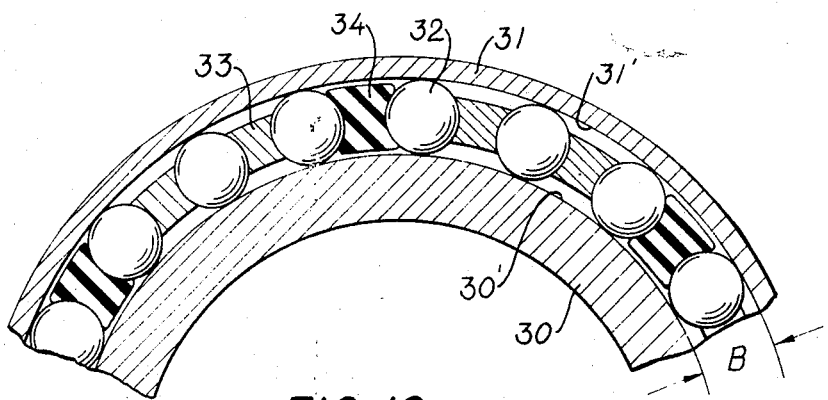
FIG. 10 is a partial cross section through a roller bearing according to applicants' invention.

Referring now to the drawings and especially to FIG. 10, it will be seen that the anti-friction bearing according to the present invention comprises an inner race 30 and an outer race 31 having respectively race surfaces 30' and 31' between which the rolling elements 32, shown in FIG. 10 as balls, are located and guided. The balls 32 are held spaced from each other by spacer means which comprise, as shown in FIG. 10 rigid spacer means 33 and elastic spacer means 34. The rigid spacer means 33 are formed from metal, preferably steel, and the rigid spacer means 33 may be formed by individual parts, or the rigid spacer means between any two sucessive elastic spacer means may be combined into a substantially rigid cage portion. The elastic spacer means 34, shown in FIG. 10 between each successive group of three balls, are shown in FIG. 10 as being integrally made in one piece from elastic material such as for instance rubber or any other suitable elastically compressible material and various embodiments of such elastic spacer means, differing from that shown in FIG. 10 are respectively illustrated in FIGS. 1-8 which will be described later on.

The length and the elasticity of the elastic spacer means 34 is chosen in such a manner so as not to impart, under normal operating conditions, any pretension to the chain of rolling elements of the bearing. The spacer means 34 is preferably in the form of a short cylinder of a diameter such that the outer peripheral surface is kept under normal operating conditions out of contact with the race surfaces 30' and 31'.

In the preferred form shown in FIG. 10, the end faces of the spacer means 34 are respectively formed with cavities in the form of a spherical segment so that the spacer means will engage with an uninterrupted surface thereof substantial portions of the rolling element 32 adjacent thereto, whereby the specific surface pressure between spacer means and adjacent rolling elements is held to a minimum so as to reduce wear of these elements and the spacer means.

Various embodiments of the elastic spacer means according to applicants' invention are shown in FIGS. 1-8. Preferably the elastic spacer means are of substantially cylindrical shape. In all embodiments, the elastic spacer means according to applicants' invention has a longitudinal cross section substantially in the form of a rectangle which has, as clearly shown in FIGS. 1 and 2, a diagonal A which is greater than the maximum distance B, shown in FIG. 10, between the race surfaces 30' and 31' between which the rolling elements 32 are guided. Due to this specific feature of applicants' invention the spacer means are prevented, in compressed as well as uncompressed condition, from tilting between the race surfaces.

Figure 1:
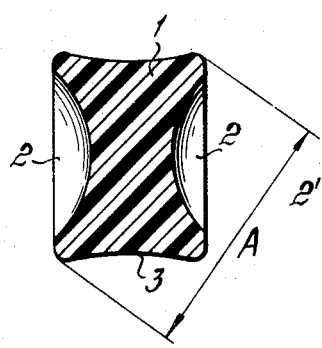
FIG. 1 is a longitudinal cross section through a short cylindrical spacer according to applicants' invention, integrally made from elastic material and having an inwardly curved peripheral surface and being formed at opposite end faces thereof respectively with central cavities.

The elastic spacer means 1 shown in FIG. 1 in longitudinal cross section are integrally made from elastic material and formed on opposite end faces thereof with cavities 2 which are made, when the spacer means 1 is used in a ball bearing in form of spherical segments. The peripheral surface 3 of the spacer means 1 is concavely curved.

Figure 2:
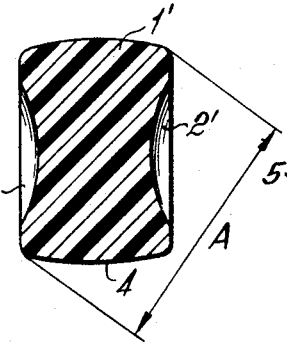
FIG. 2 is a longitudinal cross section through a spacer similar to that shown in FIG. 1 and the embodiment shown in FIG. 2 differs from that shown in FIG. 1 in that the peripheral surface of the spacer is convexly curved.

The elastic spacer means 1' shown in FIG. 2 differs from the above described spacer means 1 only in that the peripheral surface 4 is convexly curved.

Figure 7:
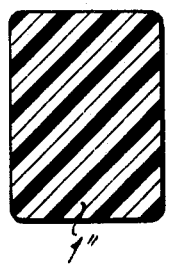
FIG. 7 is a longitudinal cross section through a spacer similar to that shown in FIG. 1 and integrally made from elastic material in the form of a short cylinder.
Figure 8:
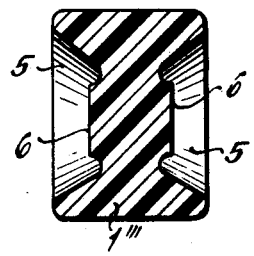
FIG. 8 is a longitudinal cross section through an embodiment similar to FIG. 7 in which the short cylinder, integrally made from elastic material is provided at opposite end faces thereof with frustoconical cavities.

FIGS. 7 and 8 respectively show elastic spacer means 1" and 1''' which are, similar to the spacer means shown in FIGS. 1 and 2, also integrally made from elastic material, and the spacer means 1" of FIG. 7 is in the form of a short cylindrical body without cavities in the end faces thereof, whereas the spacer means 1''' shown in FIG. 8 is formed at the end faces thereof with substantially frustoconical cavities 5 having slightly raised bottom faces 6 adapted to abut against adjacent rolling elements.

Figure 3:
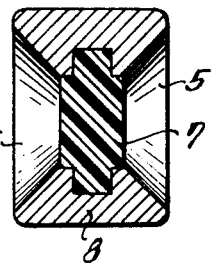
FIG. 3 is a longitudinal cross section through a spacer having an outer annular portion formed from any material and a central core portion from elastic material.

FIG. 3 shows an additional embodiment of the elastic spacer means according to the present invention in longitudinal cross section. This elastic spacer means consists of an outer annular portion 8 of substantially rigid material such as for instance metal and a central core portion 7 of smaller width than the outer annular portion 8 and extending transversely through the interior of the outer annular portion. The annular portion 8 is formed with an inner groove into which the central portion 7 extends so that the central portion will be properly fixed to the annular portion 8. The end faces of the annular portion 8 are beveled so as to form frustoconical cavities 5 at opposite ends of the spacer means. The width of the central elastic portion 7 and the conicity of the cavities 5 are chosen in such a manner that under normal operating conditions the adjacent rolling elements will abut only against the end faces of the elastic core 7 while being spaced from the faces of the rigid outer annular portion 8.

Figure 4:
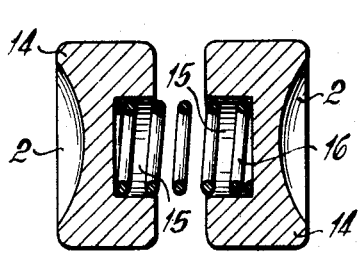
FIG. 4 is a longitudinal cross section through a further embodiment of a spacer according to applicants' invention comprising a pair of substantially equal parts and a compression spring sandwiched therebetween.
Figure 5:
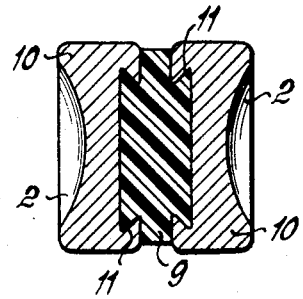
FIG. 5 is a longitudinal cross section through an additional embodiment in which the spacer is formed by two rigid outer parts with an elastic part sandwiched between the rigid outer parts.

An additional embodiment is shown in cross section in FIG. 4 and this embodiment comprises two substantially equal parts 14 held spaced from each other under normal operating conditions by a compression spring 16 sandwiched between the inner end faces of the parts 14. Each of the parts 14 is preferably formed on the end face facing the other part with a central cavity 15 in which the opposite ends of the spring 16 are respectively located. The outer end faces of the parts 14 are again formed with spherical cavities 2. A similar construction is shown in FIG. 5 in which the spacer means comprises two substantially equal outer rigid portions 10 and a portion 9 formed from elastic material sandwiched between the outer portions 10. The elastic portion 9 is connected to the rigid portions 10 by dovetail connections 11. The end faces of the spacer means shown in FIG. 5 are again formed with cavities 2 respectively formed as spherical segments.

Figure 6:
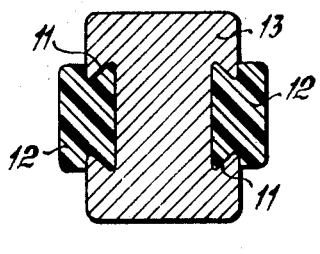
FIG. 6 is a longitudinal cross section through a further embodiment according to the present invention comprising a rigid central portion and two elastic portions projecting to opposite sides of the rigid portion.

Finally, FIG. 6 shows a longitudinal cross section through an embodiment of the elastic spacer means according to applicants' construction which comprises a central rigid portion 13 and two elastic portions 12 dovetailed at 11 to the central portion 13 and respectively projecting with end portions thereof from opposite end faces of the central portion 13.

Figure 11:
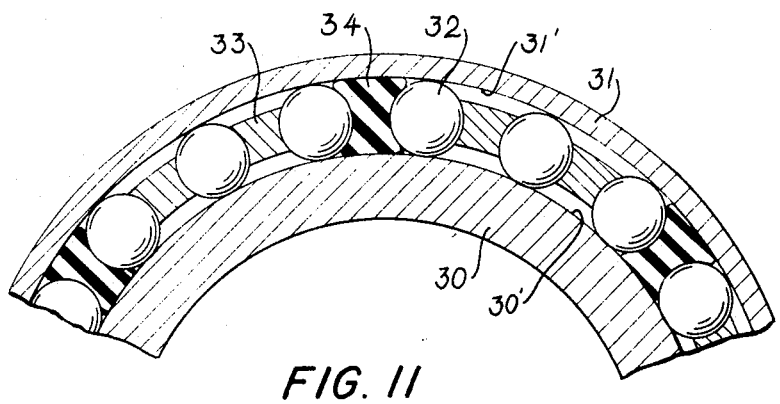
FIG. 11 is a partial cross section similar to FIG. 10 showing the spacer means in compressed condition.

The elastic spacer means 34 shown in FIG. 10 as well as the elastic spacer means shown in FIGS. 1, 2, 5, 7 and 8 are also adapted to provide for a damping action when the bearing provided with such spacer means is used to support a member which carries out quickly alternating turning movements in opposite directions with respect to another member. In such an application the rolling elements will be subjected to a crowding action and some of the elastic spacer means will thereby be axially compressed while being simultaneously expanded in radial direction so that the peripheral surfaces thereof will be pressed against the race surfaces 30' and 31' as shown in FIG. 11. Thereby, a braking or damping moment will be produced which will check the turning movement of the supported member. The elastic spacer means shown in FIGS. 10, 1, 2, 7 and 8 are best suitable for this purpose, a certain braking action will also be obtainable from the embodiment shown in FIG. 5, whereas the embodiments shown in FIGS. 3, 4 and 6 cannot be used for such an application.

Figure 9:
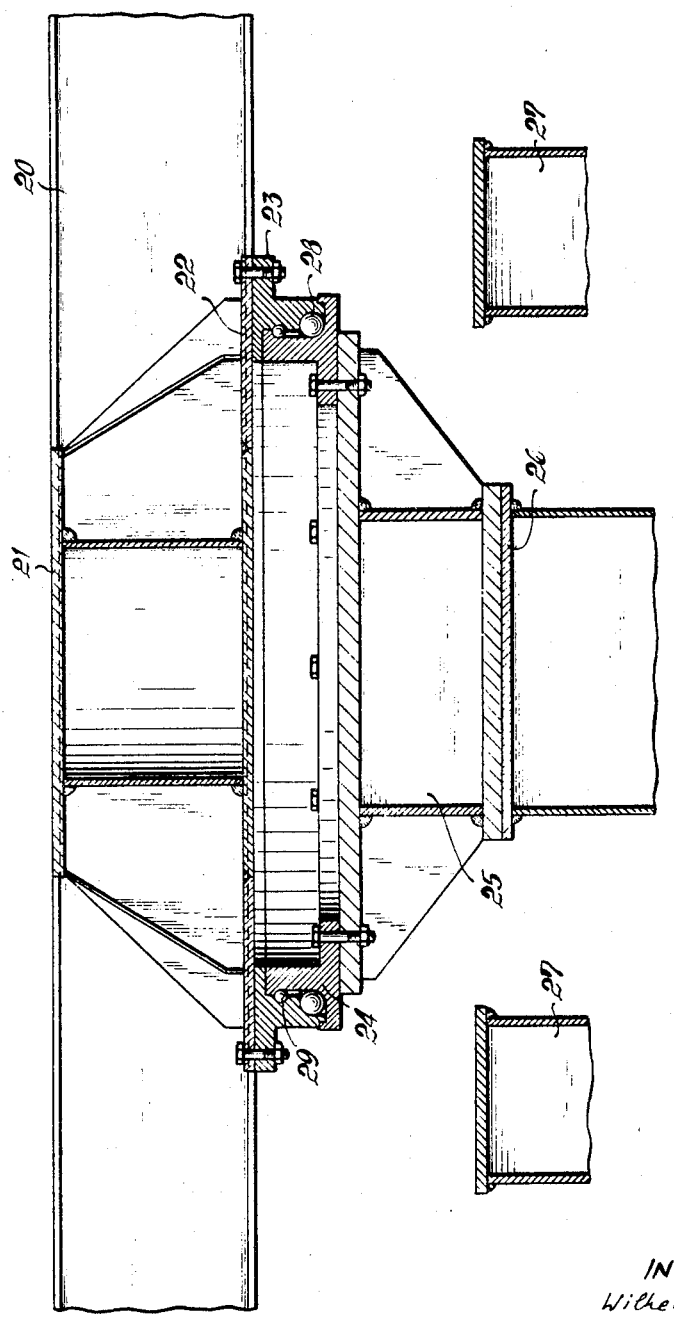
FIG. 9 is a cross section through a pivot mounting of a railroad vehicle or the like in which an anti-friction bearing according to applicants' invention is used.

FIG. 9 shows schematically a construction in which an anti-friction bearing with elastic spacer means are used, as for instance shown in FIGS. 1, 2, 5, 7, 8 and 10, which will provide for a damping or braking moment. FIG. 9 is a schematic cross section through a pivot arrangement of a railroad car or the like which comprises a longitudinal beam 20 of the car and a cross beam 21 to which by means of the construction element 22 the outer and upper ring 23 of the bearing is connected. The inner and lower ring 24 rests and is fastened to the element 25, which in turn is connected to the cradle frame 26 which is arranged between the cross beams of the carriage schematically shown in part at 27. Balls 28 of the bearing are shown between the rings 23 and 24 thereof and it is understood that the ball bearings thus formed includes elastic spacer means as shown at 34 in FIGS. 10 and 11 or elastic spacer means as shown in FIGS. 1, 2, 5, 7 and 8 which have at least an elastic portion which when the balls of the bearing are subjected to a crowding action will be compressed in axial direction and simultaneously expanded in radial direction so that the peripheral surfaces of the spacer means will be pressed in engagement with the race surfaces of the rings 23 and 24 to impart a damping or braking moment to the arrangement. A second row of balls 29 having each a diameter smaller than the balls 28 is shown above the latter and these balls will cooperate with the two rings 23 and 24 of the bearing to prevent axial movement of the same relative to each other.

It will be understood that each of the elements described above, or two or more together, may also find a useful application in other types of anti-friction bearings with elastic spacer means differing from the types described above.

While the invention has been illustrated and described as embodied in anti-friction bearings with elastic spacer means of specific construction shown in the drawing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Lettters Patent is:

1. In a bearing assembly, in combination, a pair of bearing races having race surfaces spaced from each other a predetermined maximum distance; a plurality of groups of rolling elements located adjacent to each other between said race surfaces of said bearing races; rigid spacer means between the rolling elements of each group; and elastic spacer means between the last rolling element of each group and the first rolling element of the group adjacent thereto, said elastic spacer means having each in a plane substantially normal to a plane of symmetry between the respective adjacent rolling elements a substantially rectangular cross section having a diagonal greater than said predetermined maximum distance so that said spacer means, in compressed as well as in uncompressed condition, are prevented from tilting and the dimensions and elasticity of said elastic spacer means being such so as not to impart a pretension to the chain of rolling elements during normal operation of the bearing.

2. In a bearing assembly, in combination, a pair of bearing races having race surfaces spaced from each other a predetermined maximum distance; a plurality of rolling elements located adjacent to each other between said race surfaces of said bearing races; and elastic spacer means located between at least some of said adjacent rolling elements, said elastic spacer means having each in a plane substantially normal to a plane of symmetry between the respective adjacent rolling elements a substantially rectangular cross section having a diagonal greater than said predetermined maximum distance so that said spacer means, in compressed as well as in uncompressed condition, are prevented from tilting, said elastic spacer means having a peripheral surface spaced from said race surfaces and having at least an elastic portion which, when said rolling elements are subjected to a crowding action, is compressed in axial direction and simultaneously expanded in a direction transverse to said axial direction into contact with said race surfaces to impart a damping moment to the rotary movement of the bearing assembly.

3. A bearing assembly as defined in claim 2 in which each of said elastic spacer means includes a pair of rigid end portions and in which said elastic portion is sandwiched between said rigid end portions.

4. A bearing assembly as defined in claim 3 in which said elastic portion is dovetailed into said rigid portions.

5. In a roller bearing assembly, in combination, a pair of bearing races having respectively race surfaces spaced from each other a predetermined maximum distance; a plurality of balls located adjacent each other between said race surfaces; and a plurality of substantially cylindrical elastic spacer means each integrally formed from elastic material and respectively located between at least some of adjacent balls of said plurality of balls, said elastic spacer means having in axial direction a substantially rectangular cross section greater than said maximum predetermined distance so that said elastic spacer means, even in uncompressed condition, are prevented from tilting in the space between said race surfaces, said spacer means having an outer peripheral surface normally spaced from said race surfaces and said spacer means being compressed in axial direction and simultaneously expanded in radial direction into contact with said race surfaces, when said balls of said bearing assembly are subjected to a crowding action, to impart a damping moment to the rotary movement of the roller bearing assembly.

6. A roller bearing assembly as defined in claim 5 in which the opposite end faces of each elastic spacer means are each formed with a cavity in the shape of a spherical segment.

7. A roller bearing assembly as defined in claim 5 in which the opposite end faces of each elastic spacer means are each formed with a cavity of substantially frusto-conical shape.

8. A roller bearing assembly as defined in claim 5 in which said peripheral surface of each elastic spacer means is concavely curved.

9. A roller bearing assembly as defined in claim 5 in which said peripheral surface of each elastic spacer means is convexly curved.

10. In a bearing assembly, in combination, a pair of bearing races having race surfaces spaced from each other a predetermined maximum distance; a plurality of rolling elements located adjacent to each other between said race surfaces of said bearing races; and elastic spacer means located between at least some of said adjacent rolling elements, said elastic spacer means having each in a plane substantially normal to a plane of symmetry between the respective adjacent rolling elements a substantially rectangular cross section having a diagonal greater than said predetermined maximum distance so that said spacer means, in compressed as well as in uncompressed condition, are prevented from tilting, each of said elastic spacer means including a central substantially rigid portion and a pair of end portions formed from elastically compressible material and respectively projecting from opposite end faces of said rigid portion fixed to the latter.

11. In a bearing assembly, in combination, a pair of bearing races having race surfaces spaced from each other a predetermined maximum distance; a plurality of groups of rolling elements located adjacent to each other between said race surfaces; rigid spacer means between the rolling elements of each group; and elastic spacer means between the last rolling element of each group and the first rolling element of the group adjacent thereto, said elastic spacer means having in a plane of symmetry normal to the bearing axis a substantially rectangular cross section having a diagonal greater than said predetermined maximum distance so that the spacer means, in compressed as well as in uncompressed condition, are prevented from tilting and the dimensions and elasticity of said elastic spacer means being such so as not to impart a pretension to the chain of rolling elements during normal operation of the bearing, said elastic spacer means having a peripheral surface spaced from said race surfaces and having at least an elastic portion which, when said rolling elements are subjected to crowding action, is compressed in axial direction and simultaneously expanded in a direction transverse to said axial direction into contact with said race surfaces to impart a damping moment to the rotary movement of the bearing assembly.

References Cited by the Examiner

UNITED STATES PATENTS

| | | | |
|---|---|---|---|
| 860,186 | 7/07 | Beemer | 308—199 |
| 1,261,154 | 4/18 | Newmann | 308—199 |
| 2,697,644 | 12/54 | Zeilman | 308—199 |
| 2,827,345 | 3/58 | Zeilman | 308—199 |
| 2,893,792 | 7/59 | Wikoff | 308—199 |
| 3,037,827 | 6/62 | Kupchick | 308—199 |
| 3,058,789 | 10/62 | Ham | 308—199 |

ROBERT C. RIORDON, *Primary Examiner.*

FRANK SUSKO, *Examiner.*